United States Patent
Esaki et al.

(10) Patent No.: US 11,572,841 B2
(45) Date of Patent: Feb. 7, 2023

(54) SINGLE-SHAFT COMBINED CYCLE PLANT, TESTING METHOD FOR SINGLE-SHAFT COMBINED CYCLE PLANT, AND CONTROL DEVICE FOR SINGLE-SHAFT COMBINED CYCLE PLANT

(71) Applicant: Mitsubishi Power, Ltd., Kanagawa (JP)

(72) Inventors: Daisuke Esaki, Kanagawa (JP); Katsuhiro Aoki, Kanagawa (JP); Yoji Endo, Kanagawa (JP); Junya Ideguchi, Kanagawa (JP); Naoya Kanakuchi, Kanagawa (JP); Takashi Shiraiwa, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 133 days.

(21) Appl. No.: 17/041,865

(22) PCT Filed: Mar. 1, 2019

(86) PCT No.: PCT/JP2019/008092
§ 371 (c)(1),
(2) Date: Sep. 25, 2020

(87) PCT Pub. No.: WO2019/187980
PCT Pub. Date: Oct. 3, 2019

(65) Prior Publication Data
US 2021/0010393 A1 Jan. 14, 2021

(30) Foreign Application Priority Data

Mar. 29, 2018 (JP) .............................. JP2018-065685

(51) Int. Cl.
*F02C 9/28* (2006.01)
*F01D 21/02* (2006.01)
(Continued)

(52) U.S. Cl.
CPC ................ *F02C 9/28* (2013.01); *F01D 15/10* (2013.01); *F01D 21/003* (2013.01); *F01D 21/02* (2013.01);
(Continued)

(58) Field of Classification Search
CPC ........... F05D 2260/83; F05D 2270/021; F05D 2270/023; F05D 2270/304; F01D 21/003;
(Continued)

(56) References Cited

U.S. PATENT DOCUMENTS 9,976,440 B2  5/2018  Bennauer et al.
10,036,275 B2  7/2018  Ophey et al.
(Continued)

FOREIGN PATENT DOCUMENTS

CN  104343474  2/2015
CN  105556065  5/2016
(Continued)

OTHER PUBLICATIONS

International Search Report dated May 21, 2019 in International (PCT) Application No. PCT/JP2019/008092.
(Continued)

*Primary Examiner* — Stephanie Sebasco Cheng
*Assistant Examiner* — Jingchen Liu
(74) *Attorney, Agent, or Firm* — Wenderoth, Lind & Ponack, L.L.P.

(57) ABSTRACT

This single-shaft combined cycle plant comprises: a power generator; a gas turbine; a steam turbine that is driven by using waste heat from the gas turbine, and is connected to the power generator by a clutch when the rotational speed syncs with the rotational speed of the gas turbine; a steam turbine over-rotation prevention device; a gas turbine over-rotation prevention device; and a control device. The control device sets the power generator to an unloaded state and,
(Continued)

whilst maintaining the rotational speed Ng of the gas turbine so as to be higher than the rotational speed Ns of the steam turbine and lower than the maximum rotational speed Nglim of the gas turbine, increases the rotational speed Ns of the steam turbine to the maximum rotational speed Nslim of the steam turbine (time t2-t4) and tests whether or not the steam turbine over-rotation prevention device operates normally.

9 Claims, 3 Drawing Sheets (51) Int. Cl.
*F01D 21/20* (2006.01)
*F01K 23/10* (2006.01)
*F02C 6/18* (2006.01)
*F01K 23/14* (2006.01)
*F01D 15/10* (2006.01)
*F01D 21/00* (2006.01)
*F01K 23/00* (2006.01)

(52) U.S. Cl.
CPC .............. *F01D 21/20* (2013.01); *F01K 23/00* (2013.01); *F01K 23/101* (2013.01); *F01K 23/14* (2013.01); *F02C 6/18* (2013.01); *F05D 2220/72* (2013.01); *F05D 2220/76* (2013.01); *F05D 2270/021* (2013.01)

(58) Field of Classification Search
CPC ........ F01D 21/02; F01K 13/003; F01K 13/02; G01M 15/14
See application file for complete search history.

(56) References Cited

U.S. PATENT DOCUMENTS 11,274,573 B2 * 3/2022 Ngo .................. F01K 13/02
2016/0201501 A1    7/2016 Ophey et al.

FOREIGN PATENT DOCUMENTS

| EP | 2848775 A1 * | 3/2015 | ........... F01D 21/003 |
| JP | 2005180370 A * | 7/2005 | |
| JP | 6185162 | 8/2017 | |
| WO | 2016/066539 | 5/2016 | |

OTHER PUBLICATIONS

Office Action dated Mar. 25, 2022 in Chinese Application No. 201980021609.8, with English translation.

* cited by examiner

SINGLE-SHAFT COMBINED CYCLE PLANT, TESTING METHOD FOR SINGLE-SHAFT COMBINED CYCLE PLANT, AND CONTROL DEVICE FOR SINGLE-SHAFT COMBINED CYCLE PLANT

TECHNICAL FIELD

The present invention relates to a single-shaft combined cycle plant, a testing method for a single-shaft combined cycle plant, and a control device for a single-shaft combined cycle plant.

BACKGROUND ART

In the related art, a technique for a single-shaft combined cycle plant is known. For example, PTL 1 discloses a method for testing whether or not an over-rotation prevention device of a single-shaft combined cycle plant is in a normal operation. In the single-shaft combined cycle plant, an output shaft of a steam turbine is connected to a generator, and an output shaft of a gas turbine is connected to the generator via a coupler (clutch). Then, in a state where the gas turbine and the steam turbine are operated at a test rotation speed which is equal to a normal operation rotation speed, a load connected to the generator is disconnected, and each rotation speed of the gas turbine and the steam turbine is increased, thereby testing whether or not each over-rotation prevention device of the steam turbine and the gas turbine is operated.

CITATION LIST

Patent Literature

[PTL 1] Japanese Patent No. 6185162

SUMMARY OF INVENTION

Technical Problem

Incidentally, in a single-shaft combined cycle plant, an output shaft of a gas turbine may be connected to a generator, and an output shaft of a steam turbine may be connected to the generator via a Synchro Self Shifting (SSS) clutch. The SSS clutch is a clutch that engages with shafts to be connected when rotation speeds of the shafts are synchronized with each other. In the single-shaft combined cycle plant configured in this way, when over-rotation prevention is tested for the steam turbine, if the SSS clutch engages with the shafts at high speed rotation, there is a possibility that the SSS clutch may be damaged.

The present invention is made in view of the above-described circumstances, and an object thereof is to test the over-rotation prevention of the steam turbine in a single-shaft combined cycle plant, without engagement with the shaft of the steam turbine and the shaft of the gas turbine to the generator by the clutch when the rotation speeds of the both shafts are synchronized with each other.

Solution to Problem

According to the present invention, in order to solve the above-described problem and to achieve the object, there is provided a single-shaft combined cycle plant including a generator, a gas turbine connected to the generator, a steam turbine driven by using waste heat of the gas turbine, and connected to the generator by a clutch when a rotation speed of the steam turbine is synchronized with a rotation speed of the gas turbine, a steam turbine over-rotation prevention device that stops an operation of the steam turbine, when the rotation speed of the steam turbine reaches a predetermined steam turbine upper limit rotation speed, a gas turbine over-rotation prevention device that stops an operation of the gas turbine, when the rotation speed of the gas turbine reaches a predetermined gas turbine upper limit rotation speed, and a control device that brings the generator into an unloaded state, that increases the rotation speed of the steam turbine until the rotation speed of the steam turbine reaches the steam turbine upper limit rotation speed while maintaining the rotation speed of the gas turbine to be lower than the gas turbine upper limit rotation speed, in a state where connection between the generator and the steam turbine by the clutch is released by setting the rotation speed of the gas turbine to be higher than the rotation speed of the steam turbine, and that tests whether or not the steam turbine over-rotation prevention device is in a normal operation.

According to this configuration, the rotation speed of the gas turbine is maintained to be lower than the gas turbine upper limit rotation speed. In this manner, the gas turbine over-rotation prevention device is not operated. Therefore, it is possible to prevent a possibility that the rotation speed of the gas turbine may be lower than the rotation speed of the steam turbine. As a result, the rotation speed of the gas turbine can be constantly maintained to be higher than the rotation speed of the steam turbine. Without engagement with the clutch, the rotation speed of the steam turbine can be increased until the rotation speed of the steam turbine reaches the steam turbine upper limit rotation speed. Therefore, in the single-shaft combined cycle plant, over-rotation prevention can be tested for the steam turbine, without engagement with the clutch that connects the steam turbine to the generator and the gas turbine.

In addition, when the rotation speed of the steam turbine reaches the steam turbine upper limit rotation speed, before the rotation speed of the gas turbine reaches the gas turbine upper limit rotation speed, it is preferable that the control device decreases the rotation speed of the gas turbine to a predetermined rotation speed which is higher than the rotation speed of the steam turbine.

According to this configuration, after the steam turbine over-rotation prevention device is operated, the gas turbine over-rotation prevention device cannot be operated. As a result, it is possible to prevent engagement with the clutch, when the rotation speed of the gas turbine is abruptly decreased and becomes lower than the rotation speed of the steam turbine due to the operation of the gas turbine over-rotation prevention device.

In addition, the gas turbine over-rotation prevention device may be an electronically controlled device controlled by the control device. When the rotation speed of the steam turbine reaches the steam turbine upper limit rotation speed, it is preferable that the control device causes the gas turbine over-rotation prevention device to stop the operation of the gas turbine.

According to this configuration, a normal operation of the steam turbine over-rotation prevention device can be tested. Consecutively, a normal operation of the gas turbine over-rotation prevention device can be tested.

In addition, the control device may start driving the steam turbine while operating the gas turbine at a rated rotation speed, and when the rotation speed of the steam turbine is equal to or higher than a predetermined rotation speed which is lower than the steam turbine upper limit rotation speed, it is preferable that the control device increases the rotation speed of the gas turbine at an increase rate which is the same as that of the rotation speed of the steam turbine.

According to this configuration, the gas turbine is operated at the rated rotation speed. In this manner, it is possible to use highest temperature waste heat when the gas turbine is in an unloaded state. Therefore, steam that satisfies a ventilation condition of the steam turbine can be quickly generated to start driving the steam turbine, and the rotation speed of the steam turbine can be quickly increased. In addition, when the rotation speed of the steam turbine is equal to or higher than a predetermined rotation speed, the rotation speed of the gas turbine is increased at the increase rate which is the same as that of the rotation speed of the steam turbine. In this manner, the rotation speed of the gas turbine is maintained to be higher than the rotation speed of the steam turbine. Accordingly, it is possible to prevent the gas turbine over-rotation prevention device from being operated.

In addition, the steam turbine over-rotation prevention device may be an electronically controlled device controlled by the control device. When the rotation speed of the steam turbine reaches the steam turbine upper limit rotation speed, it is preferable that the control device causes the steam turbine over-rotation prevention device to stop the operation of the steam turbine.

According to this configuration, it is possible to test whether or not the electronically controlled steam turbine over-rotation prevention device is in a normal operation.

According to the present invention, in order to solve the above-described problem and to achieve the object, there is provided a testing method for a single-shaft combined cycle plant including a generator, a gas turbine connected to the generator, a steam turbine driven by using waste heat of the gas turbine, and connected to the generator by a clutch when a rotation speed of the steam turbine is synchronized with a rotation speed of the gas turbine, a steam turbine over-rotation prevention device that stops an operation of the steam turbine, when the rotation speed of the steam turbine reaches a predetermined steam turbine upper limit rotation speed, and a gas turbine over-rotation prevention device that stops an operation of the gas turbine, when the rotation speed of the gas turbine reaches a predetermined gas turbine upper limit rotation speed. The testing method includes bringing the generator into an unloaded state, increasing the rotation speed of the steam turbine until the rotation speed of the steam turbine reaches the steam turbine upper limit rotation speed while maintaining the rotation speed of the gas turbine to be lower than the gas turbine upper limit rotation speed, in a state where connection between the generator and the steam turbine by the clutch is released by setting the rotation speed of the gas turbine to be higher than the rotation speed of the steam turbine, and testing whether or not the steam turbine over-rotation prevention device is in a normal operation.

According to this configuration, the rotation speed of the gas turbine is maintained to be lower than the gas turbine upper limit rotation speed. In this manner, the gas turbine over-rotation prevention device is not operated. Therefore, it is possible to prevent a possibility that the rotation speed of the gas turbine may be lower than the rotation speed of the steam turbine. As a result, the rotation speed of the gas turbine can be constantly maintained to be higher than the rotation speed of the steam turbine. Without engagement with the clutch, the rotation speed of the steam turbine can be increased until the rotation speed of the steam turbine reaches the steam turbine upper limit rotation speed. Therefore, in the single-shaft combined cycle plant, over-rotation prevention can be tested for the steam turbine, without engagement with the clutch that connects the steam turbine to the generator and the gas turbine.

In addition, when the rotation speed of the steam turbine reaches the steam turbine upper limit rotation speed, before the rotation speed of the gas turbine reaches the gas turbine upper limit rotation speed, it is preferable that the rotation speed of the gas turbine is decreased to a predetermined rotation speed which is higher than the rotation speed of the steam turbine.

According to this configuration, after the steam turbine over-rotation prevention device is operated, the gas turbine over-rotation protection device cannot be operated. As a result, it is possible to prevent engagement with the clutch, when the rotation speed of the gas turbine is abruptly decreased and becomes lower than the rotation speed of the steam turbine due to the operation of the gas turbine over-rotation prevention device.

In addition, the gas turbine over-rotation prevention device may be an electronically controlled device. When the rotation speed of the steam turbine reaches the steam turbine upper limit rotation speed, it is preferable that the gas turbine over-rotation prevention device is caused to stop the operation of the gas turbine.

According to this configuration, a normal operation of the steam turbine over-rotation prevention device can be tested. Consecutively, a normal operation of the gas turbine over-rotation prevention device can be tested.

In addition, the steam turbine may start to be driven while the gas turbine is operated at a rated rotation speed, and when the rotation speed of the steam turbine is equal to or higher than a predetermined rotation speed which is lower than the steam turbine upper limit rotation speed, it is preferable that the rotation speed of the gas turbine is increased at an increase rate which is the same as that of the rotation speed of the steam turbine.

According to this configuration, the gas turbine is operated at the rated rotation speed. In this manner, it is possible to use highest temperature waste heat when the gas turbine is in an unloaded state. Therefore, steam that satisfies a ventilation condition of the steam turbine can be quickly generated to start driving the steam turbine, and the rotation speed of the steam turbine can be quickly increased. In addition, when the rotation speed of the steam turbine is equal to or higher than a predetermined rotation speed, the rotation speed of the gas turbine is increased at the increase rate which is the same as that of the rotation speed of the steam turbine. In this manner, the rotation speed of the gas turbine is maintained to be higher than the rotation speed of the steam turbine. Accordingly, it is possible to prevent the gas turbine over-rotation prevention device from being operated.

In addition, the steam turbine over-rotation prevention device may be an electronically controlled device. When the rotation speed of the steam turbine reaches the steam turbine upper limit rotation speed, it is preferable that the steam turbine over-rotation prevention device is caused to stop the operation of the steam turbine.

According to this configuration, it is possible to test whether or not the electronically controlled steam turbine over-rotation prevention device is in a normal operation.

According to the present invention, in order to solve the above-described problem and to achieve the object, there is provided a control device for a single-shaft combined cycle plant including a generator, a gas turbine connected to the generator, and a steam turbine driven by using waste heat of the gas turbine, and connected to the generator by a clutch when a rotation speed of the steam turbine is synchronized with a rotation speed of the gas turbine. The control device includes a steam turbine over-rotation prevention device that stops an operation of the steam turbine, when the rotation speed of the steam turbine reaches a predetermined steam turbine upper limit rotation speed, and a gas turbine over-rotation prevention device that stops an operation of the gas turbine, when the rotation speed of the gas turbine reaches a predetermined gas turbine upper limit rotation speed. The control device brings the generator into an unloaded state, increases the rotation speed of the steam turbine until the rotation speed of the steam turbine reaches the steam turbine upper limit rotation speed while maintaining the rotation speed of the gas turbine to be lower than the gas turbine upper limit rotation speed, in a state where connection between the generator and the steam turbine by the clutch is released by setting the rotation speed of the gas turbine to be higher than the rotation speed of the steam turbine, and tests whether or not the steam turbine over-rotation prevention device is in a normal operation.

According to this configuration, the rotation speed of the gas turbine is maintained to be lower than the gas turbine upper limit rotation speed. In this manner, the gas turbine over-rotation prevention device is not operated. Therefore, it is possible to prevent a possibility that the rotation speed of the gas turbine may be lower than the rotation speed of the steam turbine. As a result, the rotation speed of the gas turbine can be constantly maintained to be higher than the rotation speed of the steam turbine. Without engagement with the clutch, the rotation speed of the steam turbine can be increased until the rotation speed of the steam turbine reaches the steam turbine upper limit rotation speed. Therefore, in the single-shaft combined cycle plant, over-rotation prevention can be tested for the steam turbine, without engagement with the clutch that connects the steam turbine to the generator and the gas turbine.

DESCRIPTION OF EMBODIMENTS

Hereinafter, an embodiment of a single-shaft combined cycle plant, a testing method for a single-shaft combined cycle plant, and a control device for a single-shaft combined cycle plant according to the present invention will be described in detail with reference to the drawings. The present invention is not limited by the embodiment.

Figure 1:
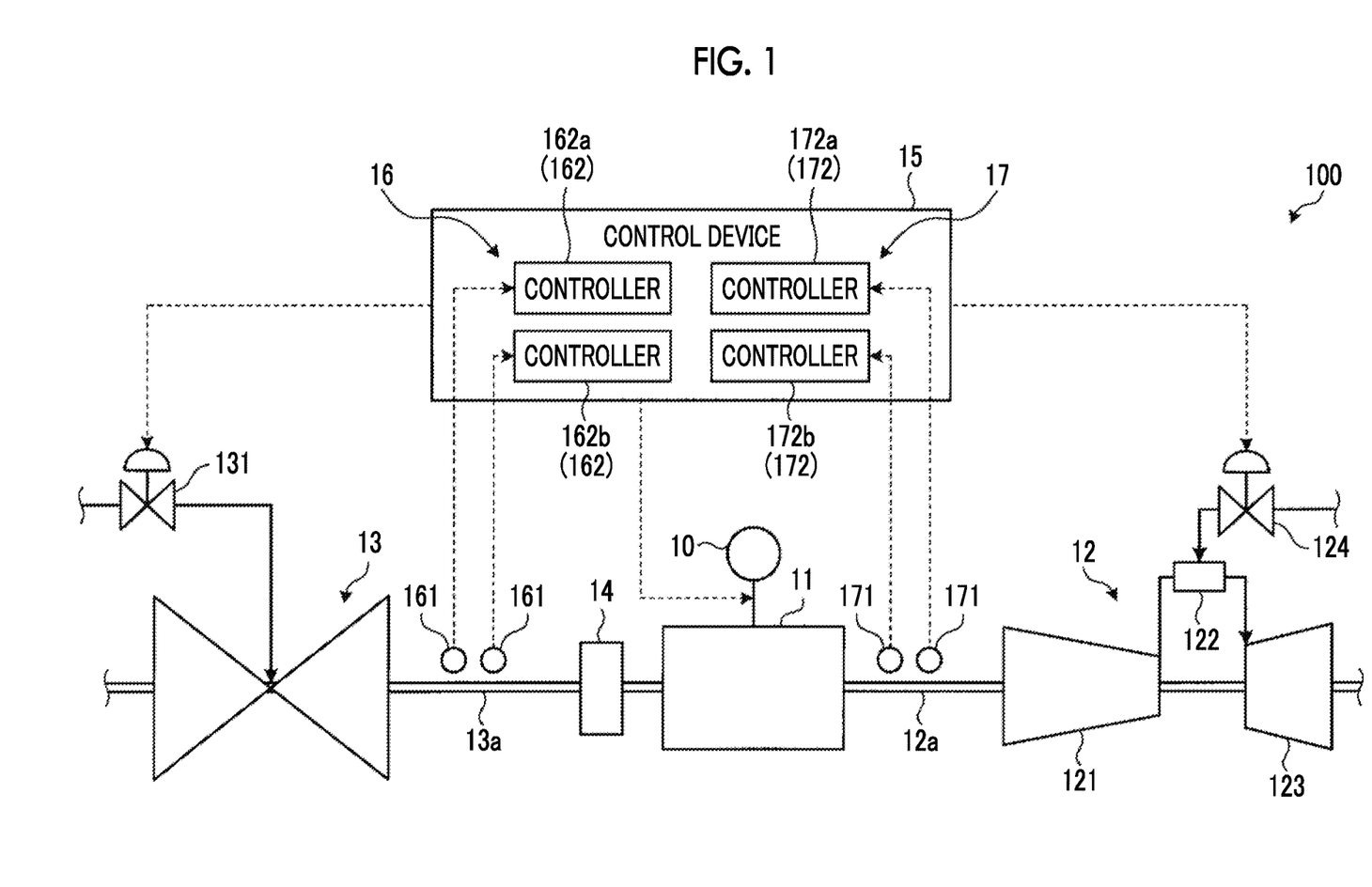
FIG. 1 is a configuration diagram illustrating an outline of a single-shaft combined cycle plant according to an embodiment.

FIG. 1 is a configuration diagram illustrating an outline of the single-shaft combined cycle plant according to the embodiment. As illustrated, a single-shaft combined cycle plant 100 includes a load 10, a generator 11, a gas turbine 12, a steam turbine 13, a clutch 14, a control device 15, a steam turbine over-rotation prevention device (hereinafter, referred to as an "ST over-rotation prevention device") 16, and a gas turbine over-rotation prevention device (hereinafter, referred to as a "GT over-rotation prevention device") 17. The control device 15, the ST over-rotation prevention device 16, and the GT over-rotation prevention device 17 may configure a device for performing a test operation of the single-shaft combined cycle plant including the generator 11, the gas turbine 12, the steam turbine 13, and the clutch 14.

The load 10 is connected to the generator 11 so that the load 10 can be electrically disconnected from the generator 11. The generator 11 is connected via a single shaft to an output shaft 12a of the gas turbine 12 and an output shaft 13a of the steam turbine 13. The generator 11 is driven by the gas turbine 12 and the steam turbine 13 to generate electric power, and supplies the electric power to the load 10.

The gas turbine 12 includes a compressor 121, a combustor 122, and a turbine 123. The gas turbine 12 mixes air compressed by the compressor 121 with a fuel supplied via a fuel supply valve 124, causes the combustor 122 to combust the mixed air and fuel, and drives the turbine 123 by using generated combustion gas, thereby rotating to output shaft 12a. Each component of the gas turbine 12 including the fuel supply valve 124 is controlled by the control device 15.

The steam turbine 13 is driven by superheated steam supplied from a boiler device (not illustrated) that uses waste heat supplied from the gas turbine 12 to generate superheated steam. In this manner, the output shaft 13a is rotated. A supply amount of the superheated steam supplied to the steam turbine 13 is adjusted by a steam supply valve 131. Each component of the steam turbine 13 including the steam supply valve 131 is controlled by the control device 15.

The clutch 14 is disposed between the output shaft 13a of the steam turbine 13 and the generator 11. The clutch 14 engages with the output shaft 13a of the steam turbine 13 and the output shaft 12a of the gas turbine 12, when a rotation speed Ns of the output shaft 13a of the steam turbine 13 and a rotation speed Ng of the output shaft 12a of the gas turbine 12 are synchronized with each other. The clutch 14 is a so-called SSS clutch. The clutch 14 connects the output shaft 13a and the generator 11 to each other, when the rotation speed Ns is equal to or higher than the rotation speed Ng, and disconnects the output shaft 13a and the generator 11 from each other, when the rotation speed Ns is lower than the rotation speed Ng. Due to structural variations in manufacturing the clutch 14, rotation speeds "to be synchronized with each other" include an error. Therefore, in the clutch 14, for example, when the rotation speed Ns is equal to or higher than 2,995 rpm and the rotation speed Ng is 3,000 rpm. Accordingly, the output shaft 13a and the generator 11 can be synchronized with and connected to each other. In addition, for example, when the rotation speed Ns is 3,004 rpm and the rotation speed Ng is 3,000 rpm, the output shaft 13a and the generator 11 are not connected to each other. For example, when the rotation speed Ns is equal to or higher than 3,005 rpm, the output shaft 13a and the generator 11 can be synchronized with and connected to each other.

The control device 15 controls each component included in the single-shaft combined cycle plant 100. The control device 15 controls each component of the gas turbine 12 including the fuel supply valve 124, and controls an operation of the gas turbine 12. The control device 15 controls each component of the steam turbine 13 including the steam supply valve 131, and controls an operation of the steam turbine 13. In addition, the control device 15 controls the load 10 and the generator 11 to be switched between electrical connection and disconnection. In addition, the control device 15 controls an operation of a boiler (not illustrated) that uses the waste heat of the gas turbine 12 to generate superheated steam, and various devices and valves for supplying the generated superheated steam to the steam turbine 13. In addition, the control device 15 performs test operation control for testing whether or not the ST over-rotation prevention device 16 and the GT over-rotation prevention device 17 are in normal operations. Details of the test operation control will be described later.

According to the present embodiment, the ST over-rotation prevention device 16 is an electronically controlled device, and is partially included in the control device 15. As illustrated in FIG. 1, the ST over-rotation prevention device 16 includes a rotation speed detection sensor 161 and a controller 162. The rotation speed detection sensor 161 is a sensor that detects the rotation speed Ns. The rotation speed detection sensors 161 are connected one by one to the controller 162. A plurality of the rotation speed detection sensors 161 may be disposed for one controller 162.

According to the present embodiment, two controllers 162 are disposed in the control device 15. Each of the controllers 162 is connected to one of the rotation speed detection sensors 161. Each of the controllers 162 acquires the rotation speed Ns from the connected rotation speed detection sensor 161, and performs over-rotation prevention control, based on the acquired rotation speed Ns. More specifically, each of the controllers 162 shuts off main valves of the steam turbine 13, when the rotation speed Ns is equal to or higher than a predetermined steam turbine upper limit rotation speed (hereinafter, referred to as an "ST upper limit rotation speed") Nslim. In this manner, each of the controllers 162 stops the operation of the steam turbine 13. In addition to the steam supply valve 131, the main valves of the steam turbine 13 indicate various valves needed to stop the operation of the steam turbine 13 in the single-shaft combined cycle plant 100.

As described above, two controllers 162 are disposed therein. Here, the two controllers 162 are distinguished from each other, and will be referred to as a "first controller 162a" and a "second controller 162b". The second controller 162b is set so that the ST upper limit rotation speed Nslim is higher than that of the first controller 162a. The second controller 162b is disposed as a backup function when there is a problem in the over-rotation prevention control performed by the first controller 162a.

According to the present embodiment, the GT over-rotation prevention device 17 is an electronically controlled device, and is partially included in the control device 15. As illustrated in FIG. 1, the GT over-rotation prevention device 17 includes a rotation speed detection sensor 171 and a controller 172. The rotation speed detection sensor 171 is a sensor that detects the rotation speed Ng. The rotation speed detection sensors 171 are connected one by one to the controller 172. A plurality of the rotation speed detection sensors 171 may be disposed for one controller 172.

According to the present embodiment, two controllers 172 are disposed in the control device 15. Each of the controllers 172 is connected to one of the rotation speed detection sensors 171. Each of the controllers 172 acquires the rotation speed Ng from the connected rotation speed detection sensor 171, and performs over-rotation prevention control, based on the acquired rotation speed Ng. More specifically, each of the controllers 172 shuts off main valves of the gas turbine 12, when the rotation speed Ng is equal to or higher than a predetermined gas turbine upper limit rotation speed (hereinafter, referred to as a "GT upper limit rotation speed") Nglim. In this manner, each of the controllers 172 stops the operation of the gas turbine 12. In addition to the fuel supply valve 124, the main valves of the gas turbine 12 indicate various valves needed to stop the operation of the gas turbine 12 in the single-shaft combined cycle plant 100.

As described above, two controllers 172 are disposed therein. Here, the two controllers 172 are distinguished from each other, and will be referred to as a "first controller 172a" and a "second controller 172b". The second controller 172b is set so that the GT upper limit rotation speed Nglim is higher than that of the first controller 172a. The second controller 172b is disposed as a backup function when there is a problem in the over-rotation prevention control performed by the first controller 172a.

Figure 2:
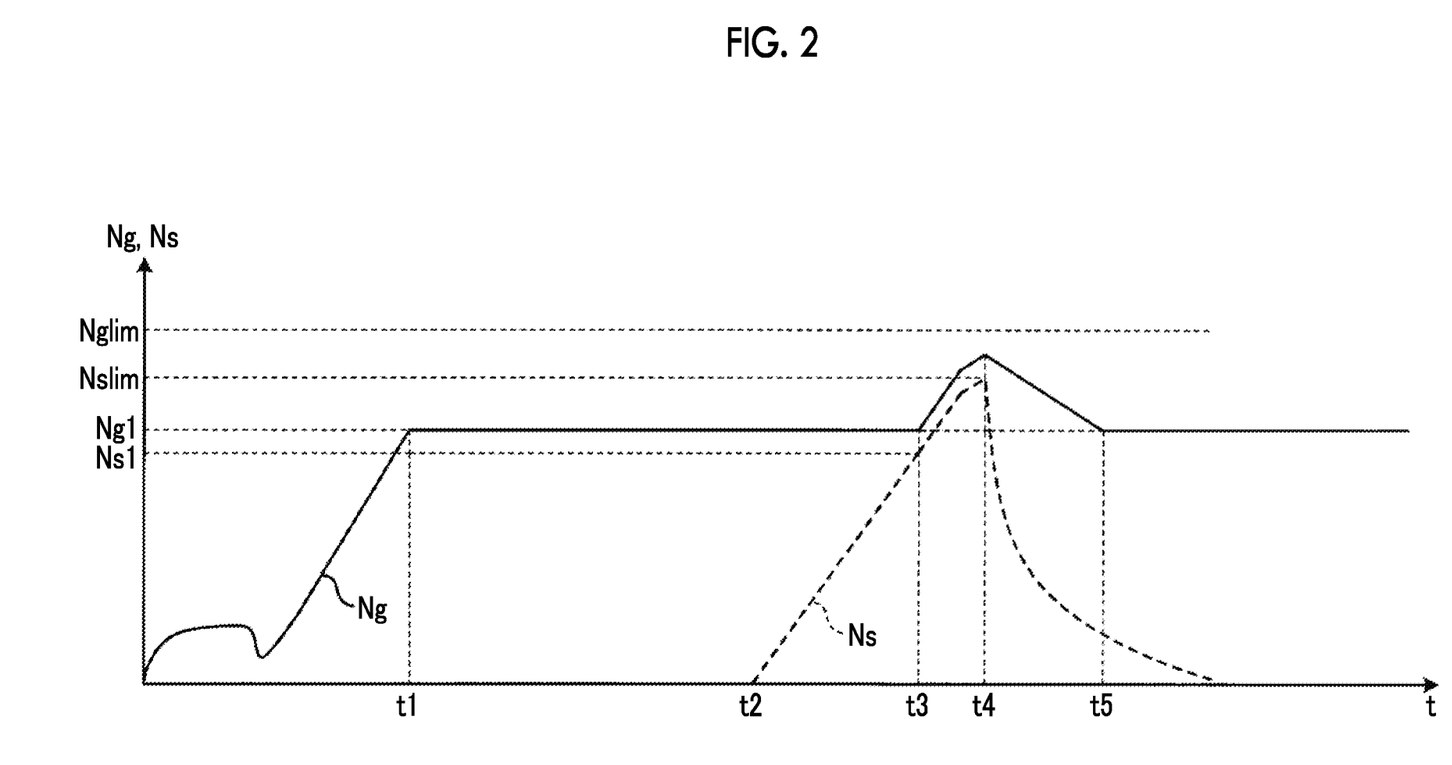
FIG. 2 is a view for describing a temporal change in each rotation speed of a gas turbine and a steam turbine while test operation control is performed.

Next, a testing method for the single-shaft combined cycle plant according to the embodiment will be described. As described above, as the testing method for the single-shaft combined cycle plant according to the embodiment, the control device 15 performs the test operation control for testing whether or not the ST over-rotation prevention device 16 is in a normal operation. FIG. 2 is a view for describing a temporal change in each rotation speed of the gas turbine and the steam turbine while the test operation control is performed. In FIG. 2, a solid line indicates the rotation speed Ng, and a broken line indicates the rotation speed Ns.

As illustrated in FIG. 2, the control device 15 first starts the operation of the gas turbine 12. At this time, the control device 15 electrically disconnects the load 10 and the generator 11 from each other to bring the generator 11 in an unloaded state. The control device 15 brings the generator 11 in the unloaded state, and increases the rotation speed Ng of the gas turbine 12 until the rotation speed Ng of the gas turbine 12 reaches a rated rotation speed Ng1 (time t1 in FIG. 2). Thereafter, the control device 15 maintains a state where the gas turbine 12 is operated at the rated rotation speed Ng1. In addition, the control device 15 uses the waste heat of the gas turbine 12 to generate the superheated steam by using a boiler (not illustrated).

When the superheated steam is sufficiently generated to drive the steam turbine 13 by using the boiler (not illustrated), the control device 15 starts the operation of the steam turbine 13 (time t2 in FIG. 2). The control device 15 increases the rotation speed Ns of the steam turbine 13 until the rotation speed Ns of the steam turbine 13 reaches the predetermined rotation speed Ns1. The predetermined rotation speed Ns1 is set as a value which is lower than the ST upper limit rotation speed Nslim. The predetermined rotation speed Ns1 is set as a value which is lower than the rated rotation speed Ng1 of the gas turbine 12 by approximately 40 rpm, for example.

When the rotation speed Ns of the steam turbine 13 reaches the predetermined rotation speed Ns1 (time t3 in FIG. 2), the control device 15 increases the rotation speed Ng of the gas turbine 12 at an increase rate which is the same as that of the rotation speed Ns of the steam turbine 13. In this manner, while the same difference is maintained between the rotation speed Ng and the rotation speed Ns, the rotation speed Ns of the steam turbine 13 increases up to the ST upper limit rotation speed Nslim in the first controller 162a (time t4 in FIG. 2). As a result, when the over-rotation prevention control is normally performed by the first controller 162a, an operation stopping process of the steam turbine 13 is performed, and the rotation speed Ns of the steam turbine 13 decreases as illustrated in FIG. 2. As illustrated in FIG. 2, when the rotation speed Ng and the rotation speed Ns are increased at the same increase rate, if a difference between the rotation speed Ns and the ST upper limit rotation speed Nslim is equal to or smaller than a predetermined value, the control device 15 decreases the increase rate of the rotation speed Ng and the rotation speed Ns. In this manner, it is possible to prevent the rotation speed Ns from being abruptly changed since the over-rotation prevention control is performed, and it is possible to correctly determine the rotation speed Ns controlled by the over-rotation prevention control. In addition, when the rotation speed Ns is not close to the ST upper limit rotation speed Nslim, the rotation speed Ng and the rotation speed Ns can be increased at an early stage.

In addition, when the rotation speed Ns of the steam turbine 13 reaches the ST upper limit rotation speed Nslim (time t4 in FIG. 2), before the rotation speed Ng of the gas turbine 12 reaches the GT upper limit rotation speed Nglim, the control device 15 decreases the rotation speed Ng of the gas turbine 12 to a predetermined rotation speed (time t5 in FIG. 2). According to the present embodiment, the predetermined rotation speed is the rated rotation speed Ng1. The predetermined rotation speed may be a rotation speed other than the rated rotation speed Ng1. In addition, the control device 15 decreases the rotation speed Ng of the gas turbine 12 to the rated rotation speed Ng1 at a rate where the rotation speed Ng of the gas turbine 12 is not lower than the rotation speed Ns of the steam turbine 13. As a result, the GT over-rotation prevention device 17 is not operated. Accordingly, the GT over-rotation prevention device 17 does not operate, and the clutch does not engage with the shaft of the steam turbine 13 and the shaft of the gas turbine 12 since the rotation speed Ng of the gas turbine 12 does not decrease.

The test operation control is performed. Therefore, it is possible to test whether or not the over-rotation prevention control is normally performed by the first controller 162a. According to the present embodiment, when it is confirmed that the rotation speed Ns of the steam turbine 13 is sufficiently decreased, the test operation control is completed. In addition, after the test operation control is completed, a user may select the followings. The operation of the single-shaft combined cycle plant 100 may be shifted to a normal operation, the operation of the single-shaft combined cycle plant 100 may be stopped, or a single operation test may be performed on the GT over-rotation prevention device 17.

As described above, in the single-shaft combined cycle plant 100 and the testing method for the single-shaft combined cycle plant 100 according to the embodiment, the rotation speed Ng of the gas turbine 12 is maintained to be lower than the GT upper limit rotation speed Nglim. In this manner, the GT over-rotation prevention device 17 is not operated. Therefore, it is possible to prevent a possibility that the rotation speed Ng of the gas turbine 12 may be lower than the rotation speed Ns of the steam turbine 13. As a result, the rotation speed of the gas turbine 12 can be constantly maintained to be higher than the rotation speed of the steam turbine 13. Without engagement with the clutch 14, the rotation speed of the steam turbine 13 can be increased until the rotation speed of the steam turbine 13 reaches the ST upper limit rotation speed Nslim. Therefore, in the single-shaft combined cycle plant 100, the over-rotation prevention can be tested for the steam turbine 13, without engagement with the clutch 14 that connects the steam turbine 13 to the generator 11 and the gas turbine 12.

In addition, when the rotation speed Ns of the steam turbine 13 reaches the ST upper limit rotation speed Nslim, before the rotation speed Ng of the gas turbine 12 reaches the GT upper limit rotation speed Nglim, the control device 15 decreases the rotation speed Ng of the gas turbine 12 to a predetermined rotation speed (rated rotation speed Ng1) which is higher than the rotation speed Ns of the steam turbine 13.

According to this configuration, after the ST over-rotation prevention device 16 is operated (after time t4 in FIG. 2), the GT over-rotation prevention device 17 cannot be operated. As a result, it is possible to prevent engagement with the clutch 14, when the rotation speed Ng of the gas turbine 12 is abruptly decreased and becomes lower than the rotation speed Ns of the steam turbine 13 due to the operation of the GT over-rotation prevention device 17.

In addition, when the control device 15 starts driving the steam turbine 13 while operating the gas turbine 12 at the rated rotation speed Ng1, and the rotation speed Ns of the steam turbine 13 is equal to or higher than the predetermined rotation speed Ns1 which is lower than the ST upper limit rotation speed Nslim, the control device 15 increases the rotation speed Ng of the gas turbine 12 at an increase rate which is the same as that of the rotation speed Ns of the steam turbine 13.

According to this configuration, the gas turbine 12 is operated at the rated rotation speed Ng1. In this manner, it is possible to use highest temperature waste heat when the gas turbine 12 is in an unloaded state. Therefore, steam that satisfies a ventilation condition of the steam turbine 13 can be quickly generated to start driving the steam turbine 13, and the rotation speed Ns of the steam turbine 13 can be quickly increased. In addition, when the rotation speed Ns of the steam turbine 13 is equal to or higher than the predetermined rotation speed Ns1, the rotation speed Ng of the gas turbine 12 is increased at the increase rate which is the same as that of the rotation speed Ns of the steam turbine 13. In this manner, the rotation speed Ng of the gas turbine 12 is maintained to be higher than the rotation speed Ns of the steam turbine 13. Accordingly, it is possible to prevent the gas turbine over-rotation prevention device from being operated.

In addition, the ST over-rotation prevention device 16 is an electronically controlled device controlled by the control device 15. When the rotation speed Ns of the steam turbine 13 reaches the ST upper limit rotation speed Nslim, the control device 15 causes the ST over-rotation prevention device 16 to stop the operation of the steam turbine 13.

According to this configuration, it is possible to test whether or not the electronically controlled ST over-rotation prevention device 16 is in a normal operation.

According to the present embodiment, the ST over-rotation prevention device 16 and the GT over-rotation prevention device 17 are electronically controlled devices controlled by the control device 15. However, the ST over-rotation prevention device 16 may be a mechanical device that automatically closes the main valves of the steam turbine 13, when the rotation speed Ns reaches the ST upper limit rotation speed Nslim. In addition, the GT over-rotation prevention device 17 may be a mechanical device that automatically closes the main valves of the gas turbine 12, when the rotation speed Ng reaches the GT upper limit rotation speed Nglim.

In addition, according to the present embodiment, a normal operation of the ST over-rotation prevention device 16 is tested by the first controller 162a. However, a normal operation of the ST over-rotation prevention device 16 may be tested by the second controller 162b. That is, without causing the first controller 162a to perform the over-rotation prevention control, at time t4 in FIG. 2, the rotation speed Ns of the steam turbine 13 may be increased until the rotation speed Ns of the steam turbine 13 reaches the ST upper limit rotation speed Nslim in the second controller 162b.

Figure 3:
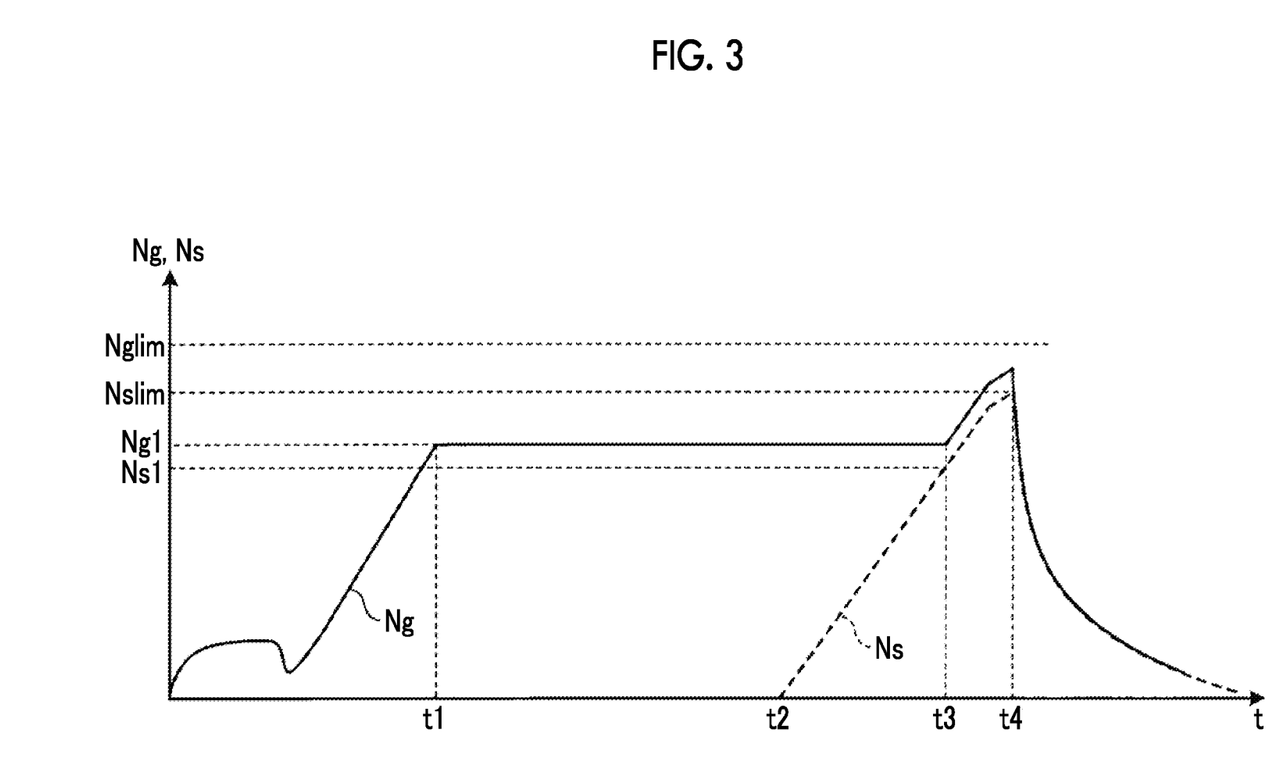
FIG. 3 is a view for describing a temporal change in each rotation speed of a gas turbine and a steam turbine while test operation control is performed according to a modification example.

FIG. 3 is a view for describing a temporal change in each rotation speed of the gas turbine and the steam turbine while test operation control is performed according to a modification example of the embodiment. In FIG. 3, control contents of the steam turbine 13 and the ST over-rotation prevention device 16 and control contents of the gas turbine 12 up to time t4 are the same as those illustrated in FIG. 2. Accordingly, description thereof will be omitted.

As the test operation control according to the modification example, when the rotation speed Ns of the steam turbine 13 reaches the ST upper limit rotation speed Nslim (time t4 in FIG. 3), the control device 15 operates the GT over-rotation prevention device 17, and stops the operation of the gas turbine 12. In this manner, as illustrated in FIG. 3, the rotation speed Ng of the gas turbine 12 decreases similarly to the rotation speed Ns of the steam turbine 13. According to this configuration, a normal operation of the ST over-rotation prevention device 16 can be tested. Consecutively, a normal operation of the GT over-rotation prevention device 17 can be tested. In this case, at least the GT over-rotation prevention device 17 needs to be an electronically controlled device controlled by the control device 15.

REFERENCE SIGNS LIST

10: load
11: generator
12: gas turbine
12a: output shaft
121: compressor
122: combustor
123: turbine
124: fuel supply valve
13: steam turbine
13a: output shaft
131: steam supply valve
14: clutch
15: control device
16: steam turbine over-rotation prevention device (ST over-rotation prevention device)
161: rotation speed detection sensor
162: controller
162a: first controller
162b: second controller
17: gas turbine over-rotation prevention device (GT over-rotation prevention device)
171: rotation speed detection sensor
172: controller
172a: first controller
172b: second controller
100: single-shaft combined cycle plant
Ng, Ns, Ns1: rotation speed
Ng1: rated rotation speed
Nglim: gas turbine upper limit rotation speed (GT upper limit rotation speed)
Nslim: steam turbine upper limit rotation speed (ST upper limit rotation speed)

The invention claimed is:

1. A single-shaft combined cycle plant comprising:
a generator;
a gas turbine connected to the generator;
a steam turbine driven by using waste heat of the gas turbine, and connected to the generator by a clutch when a rotation speed of the steam turbine is synchronized with a rotation speed of the gas turbine;
a first electronically controlled device that stops an operation of the steam turbine when the rotation speed of the steam turbine reaches a predetermined steam turbine upper limit rotation speed, the first electronically controlled device includes a steam supply valve and a first rotation speed detection sensor to measure the rotation speed of the steam turbine;
a second electronically controlled device that stops an operation of the gas turbine when the rotation speed of the gas turbine reaches a predetermined gas turbine upper limit rotation speed, the second electronically controlled device includes a fuel supply valve and a second rotation speed detection sensor to measure the rotation speed of the gas turbine; and
a third electronically controlled device that controls the first and second electronically controlled devices to test whether or not the first electronically controlled device is in a normal operation by:
bringing the generator into an unloaded state,
starting the steam turbine while operating the gas turbine at a rated rotation speed,
keeping a connection between the generator and the steam turbine released by releasing the clutch via setting the rotation speed of the gas turbine to be higher than the rotation speed of the steam turbine during a time period as well as maintaining the rotation speed of the gas turbine to be lower than the gas turbine upper limit rotation speed,
wherein during the time period, the third electronically controlled device:
increases the rotation speed of the steam turbine until the rotation speed of the steam turbine exceeds a first predetermined rotation speed, which is lower than the steam turbine upper limit rotation speed, before the rotation speed of the steam turbine reaches the rated rotation speed of the gas turbine,
increases the rotation speed of the gas turbine and the rotation speed of the steam turbine at a same increasing rate, and
stops the steam turbine by closing the steam supply valve when the rotation speed of the steam turbine reaches the steam turbine upper limit rotation speed.

2. The single-shaft combined cycle plant according to claim 1,
wherein when the rotation speed of the steam turbine reaches the steam turbine upper limit rotation speed, the third electronically controlled device controls the first electronically controlled device to close the steam supply valve to stop the steam turbine, which decreases the rotation speed of the steam turbine, and before the rotation speed of the gas turbine reaches the gas turbine upper limit rotation speed, the third electronically controlled device decreases the rotation speed of the gas turbine to a second predetermined rotation speed which is higher than the decreasing rotation speed of the steam turbine.

3. The single-shaft combined cycle plant according to claim 1,
wherein when the rotation speed of the steam turbine reaches the steam turbine upper limit rotation speed, the third electronically controlled device controls the first electronically controlled device to close the steam supply valve to stop the steam turbine, which decreases the rotation speed of the steam turbine, and the third electronically controlled device causes the second electronically controlled device to stop the operation of the gas turbine.

4. The single-shaft combined cycle plant according to claim 1,
wherein when the rotation speed of the steam turbine reaches the steam turbine upper limit rotation speed, the third electronically controlled device causes the first electronically controlled device to stop the operation of the steam turbine by closing the steam supply valve.

5. A testing method for a single-shaft combined cycle plant including
a generator,
a gas turbine connected to the generator,
a steam turbine driven by using waste heat of the gas turbine, and connected to the generator by a clutch when a rotation speed of the steam turbine is synchronized with a rotation speed of the gas turbine,
a first electronically controlled device that stops an operation of the steam turbine when the rotation speed of the steam turbine reaches a predetermined steam turbine upper limit rotation speed, the first electronically controlled device includes a steam supply valve and a first rotation speed detection sensor to measure the rotation speed of the steam turbine,
a second electronically controlled device that stops an operation of the gas turbine when the rotation speed of the gas turbine reaches a predetermined gas turbine upper limit rotation speed, the second electronically controlled device includes a fuel supply valve and a second rotation speed detection sensor to measure the rotation speed of the gas turbine; and
a third electronically controlled device that controls the first and second electronically controlled devices to test whether or not the first electronically controlled device is in a normal operation,
the testing method comprising:
bringing the generator into an unloaded state;
starting the steam turbine while operating the gas turbine at a rated rotation speed,
keeping a connection between the generator and the steam turbine released by releasing the clutch via setting the rotation speed of the gas turbine to be higher than the rotation speed of the steam turbine during a time period as well as maintaining the rotation speed of the gas turbine to be lower than the gas turbine upper limit rotation speed,
wherein during the time period, the third electronically controlled device:
increases the rotation speed of the steam turbine until the rotation speed of the steam turbine exceeds a first predetermined rotation speed, which is lower than the steam turbine upper limit rotation speed, before the rotation speed of the steam turbine reaches the rated rotation speed of the gas turbine,
increases the rotation speed of the gas turbine and the rotation speed of the steam turbine at a same increasing rate, and
stops the steam turbine by closing the steam supply valve when the rotation speed of the steam turbine reaches the steam turbine upper limit rotation speed.

6. The testing method for the single-shaft combined cycle plant according to claim 5, wherein when the rotation speed of the steam turbine reaches the steam turbine upper limit rotation speed, the third electronically controlled device controls the first electronically controlled device to close the steam supply valve to stop the steam turbine, which decreases the rotation speed of the steam turbine, and before the rotation speed of the gas turbine reaches the gas turbine upper limit rotation speed, the rotation speed of the gas turbine is decreased to a second predetermined rotation speed which is higher than the decreasing rotation speed of the steam turbine.

7. The testing method for the single-shaft combined cycle plant according to claim 5, wherein when the rotation speed of the steam turbine reaches the steam turbine upper limit rotation speed, the third electronically controlled device controls the first electronically controlled device to close the steam supply valve to stop the steam turbine, which decreases the rotation speed of the steam turbine, and the third electronically controlled device causes the second electronically controlled device to stop the operation of the gas turbine.

8. The testing method for the single-shaft combined cycle plant according to claim 5, wherein when the rotation speed of the steam turbine reaches the steam turbine upper limit rotation speed, the first electronically controlled device is caused to stop the operation of the steam turbine by closing the steam supply valve.

9. A controller for a single-shaft combined cycle plant including
a generator,
a gas turbine connected to the generator, and
a steam turbine driven by using waste heat of the gas turbine, and connected to the generator by a clutch when a rotation speed of the steam turbine is synchronized with a rotation speed of the gas turbine,
the controller comprising:
a first electronically controlled device that stops an operation of the steam turbine when the rotation speed of the steam turbine reaches a predetermined steam turbine upper limit rotation speed, the first electronically controlled device includes a steam supply valve and a first rotation speed detection sensor to measure the rotation speed of the steam turbine; and
a second electronically controlled device that stops an operation of the gas turbine when the rotation speed of the gas turbine reaches a predetermined gas turbine upper limit rotation speed, the second electronically controlled device includes a fuel supply valve and a second rotation speed detection sensor to measure the rotation speed of the gas turbine; and
the controller controls the first and second electronically controlled devices to test whether or not the first electronically controlled devices is in a normal operation by:
bringing the generator into an unloaded state,
keeping a connection between the generator and the steam turbine released by releasing the clutch via setting the rotation speed of the gas turbine to be higher than the rotation speed of the steam turbine during a time period as well as maintaining the rotation speed of the gas turbine to be lower than the gas turbine upper limit rotation speed,
wherein during the time period, the controller:
increases the rotation speed of the steam turbine until the rotation speed of the steam turbine exceeds a first predetermined rotation speed, which is lower than the steam turbine upper limit rotation speed, before the rotation speed of the steam turbine reaches the rated rotation speed of the gas turbine,
increases the rotation speed of the gas turbine and the rotation speed of the steam turbine at a same increasing rate, and stops the steam turbine by closing a steam supply valve when the rotation speed of the steam turbine reaches the steam turbine upper limit rotation speed.

* * * * *